United States Patent [19]
Hilgemann

[11] 3,817,290
[45] June 18, 1974

[54] CONVOLUTED CONDUIT CONSTRUCTION

[75] Inventor: Hans Hilgemann, Recklinghausen, Germany

[73] Assignee: Tour Agenturer AB, Johanneshov, Sweden

[22] Filed: Feb. 2, 1973

[21] Appl. No.: 329,187

[30] Foreign Application Priority Data
Feb. 4, 1972  Germany............................ 7204132

[52] U.S. Cl.................... 138/178, 138/38, 285/157
[51] Int. Cl............................................ F16l 53/00
[58] Field of Search......... 138/38, 39, 95, 111, 118, 138/177, 178; 285/157; 165/172, 177; 122/235 C, 235 D, 235 K, 247, 261

[56] References Cited
UNITED STATES PATENTS
1,417,395   5/1922   Lassiter et al. ..................... 285/157
2,040,681   5/1936   Baker................................... 73/418
2,250,325   7/1941   Barnes........................... 138/111 X
2,450,625   10/1948  Beecher............................... 73/418
2,778,609   1/1957   Peeps............................. 138/111 X

*Primary Examiner*—Charles A. Ruehl
*Attorney, Agent, or Firm*—Michael S. Striker

[57] ABSTRACT

At least two substantially parallel conduit portions having respective open ends are connected by a substantially horseshoe-shaped tubular fitting two parallel end portions of which each communicate with one of the open ends and which in turn are connected by a loop-shaped intermediate portion. The inner diameter of the fitting is equal to that of the conduit portions. The conduit portions are of synthetic plastic material; the fitting may be of synthetic plastic or metallic material.

9 Claims, 2 Drawing Figures

[3,817,290]

CONVOLUTED CONDUIT CONSTRUCTION

CROSS-REFERENCE TO RELATED APPLICATION

A related application was filed in my name on Aug. 18, 1972 and copending under Ser. No. 254,643.

BACKGROUND OF THE INVENTION

The present invention relates to an article of manufacture in general, and more particularly to a convoluted conduit, especially of synthetic plastic material.

Still more particularly the invention relates to a convoluted conduit provided with a tubular fitting connecting the convolutions of the conduit.

Still more specifically the invention relates to such a convoluted conduit which is especially usable for circulation of heat-exchange fluid and can be embedded in a structural component such as that which is for instance disclosed in my aforementioned copending application.

When such a conduit is embedded in a structural component, for instance a plate or the like which forms a floor, wall or ceiling of a room, the purpose is to pass heat-exchange fluid through the conduit in order to obtain as evenly as possible a heating or cooling of the component in which the conduit is embedded. According to the disclosure of my aforementioned application the conduit is so arranged that it is composed of parallel conduit portions which are connected at their ends, that is where the conduit changes direction. My aforementioned disclosure provides for the conduit to have a conduit section through which the heat-exchange fluid flows as it is incoming, that is fresh, and another conduit section through which the heat-exchange fluid flows as it is outgoing, that is as it is spent. To obtain even heat exchange with the surrounding material of the component in which the conduit is embedded, these sections and the conduit portions are located directly adjacent one another and are of identical interior cross-section.

It is known to provide at the ends where the conduit portions or sections change directions, a reinforcing cap which is appropriately curved. It is known from the prior art to use in an analogous application a one piece conduit which is simply bent into a curve where the direction is to be reversed, and to provide a conduit cap which is appropriately curved and is welded onto the outside of the conduit where the same has been bent to a curvature. However, I have found that if the conduit is of synthetic plastic material, as I prefer for my own conduit, it is difficult to weld the cap onto it, aside from which the rather sharp reversal of direction necessitating by this prior-art proposal causes significant flow losses in the fluid passing through the conduit at that point.

SUMMARY OF THE INVENTION

Accordingly, it is an object of the present invention to overcome the disadvantages of the prior art.

More particularly it is an object of the present invention to provide a convoluted conduit which is not possessed of these disadvantages.

Another object of the invention is to provide such a conduit in which the fitting required for the direction reversal in the flow of fluid passing through the conduit is simple to produce and to install.

A further object of the invention is to provide such a conduit wherein this fitting requires little space and, on the other hand, reduces any flow losses to a minimum.

In keeping with these objects, and others which will become apparent hereafter, one feature of the invention resides in an article of manufacture, and in particular in a convoluted conduit which comprises at least two substantially parallel conduit portions having respective adjacent open ends, and a substantially horseshoe-shaped tubular fitting connecting the conduit portions and having two parallel endportions each communicating with one of the open ends and a loop-shaped intermediate portion connecting the endportions. The inner diameter of the fitting is at least substantially equal to that of the conduit portions.

With such a construction it is possible to connect the open ends of conduit portions of a conduit (which can be unrolled from one or two supply rollers) rapidly and reliably wherever this is desired, and at the same time to maintain any flow losses as low as possible. It is now no longer necessary to bend the conduit to the desired shape, or to bend the fitting to the shape, and difficulties in terms of labor expenses, time required, problems in the connection of the fitting to the conduit portions and other problems are thereby avoided.

In order to maintain the flow losses of the medium passing through the fitting as low as possible, I prefer that in the loop-shaped portion, that is where the fitting causes the medium to change its direction of flow, the line of symmetry extending longitudinally through the fitting is located on a radius which is the smallest possible, taking into account how the strength characteristic of the fitting material, the necessity to obtain a constant internal diameter of the fitting and the desire to require as little space as possible.

The fitting is advantageously of syntehtic plastic material, for instance polybutene. In this case, and assuming that the fitting has an outer diameter of 20 mm and a wall thickness of 2 mm, the aforementioned radius should be 90 mm or less. The conduit portions themselves are also of synthetic plastic material.

To facilitate a reliable and permanent connection of the fitting with the conduit portions the fitting is provided at its endportions with sockets which are advantageously of the same synthetic plastic material, so that they can receive the respective open ends and can be welded to the conduit portions, for instance by well-known heat-welding techniques. Of course, solvent welding or other similar means of connection can also be employed. In any case, such a construction permits a rapid assembly because it is merely necessary to insert the respective open ends into the sockets, and to provide for a rapid connection which will of course be most rapidly established if it is a heat-welded connection, because in this case it is merely necessary to provide for a brief heating in order to establish the connection.

The fitting may, however, also be of metallic material and be provided with connectors permitting its releasable connection to the open ends of the conduit portions. In such a case I have found it to be advantageous to make the connectors not of metal but of the same synthetic material as that of the conduit portions themselves, for instance polybutene. The reason for this is that the connection of metallic connectors with the synthetic plastic conduit portions might not be as reliable as desired, because slippage of the two unequal materials could occur, for instance due to their differential coefficient of thermal expansion and contraction.

As pointed out before, it is desirable that the two conduit portions be close together. To assure that this is possible even where they are connected with the endportions of the tubular fitting, I have found it advantageous if one of the endportions is longer than the other so that the sockets or connectors provided on the endportions will not be located opposite each other but will be axially offset from one another, permitting the conduit portions which are connected with the respective parallel endportions to be more closely adjacent than would otherwise be possible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
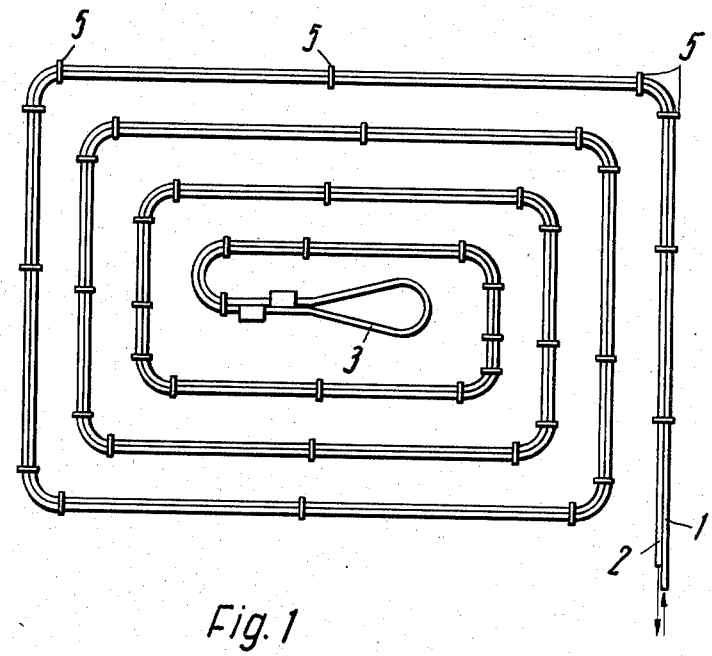
FIG. 1 is a top-plan view illustrating a convoluted conduit according to the present invention.
Figure 2:
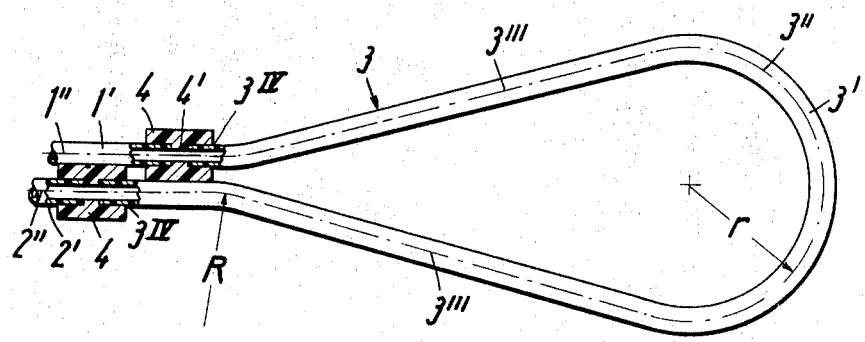
FIG. 2 is a somewhat diagrammatic partly sectioned plan view illustrating the fitting used in FIG. 1, on an enlarged scale.

Discussing FIGS. 1 and 2 in detail it will be seen that in the former Figure I have illustrated a convoluted conduit according to the present invention. It has two parallel conduit portions, identified with reference numerals 1 and 2 respectively. It will be assumed for purposes of the present explanations that the conduit portion 1 is the one through which fluid enters whereas the conduit portion 2 is the one in which fluid leaves. The cross-sectional configurations of the conduit portions 1 and 2 are identical and the conduit portions in this instance are of synthetic plastic material, for instance (but not necessarily) of polybutene. The adjacent conduit portions 1 and 2 are joined with one another in appropriate manner, here by straps 5.

The conduit portions are convoluted as is clearly visible in FIG. 1. Their inner open ends are connected by the substantially horseshoe-shaped tubular fitting 3 which is shown in more detail in FIG. 2.

The fitting 3 has a loop-shaped intermediate portion 3' and two parallel endportions $3^{IV}$. The loop-shaped intermediate portion has two elongated substantially straight intermediate sections 3''' which are joined by a substantially semi-circularly curved section 3'. The longitudinally extending line of symmetry 3'' of these sections is located in the case of the section 3' on a preferably constant radius $r$. The length of the sections 3''' is advantageously on the order of substantially 100 – 200 mm and they merge with the parallel endportions $3^{IV}$, and in particular with the longitudinally extending lines of symmetry thereof (which are coincident with the lines of symmetry 1'' and 2'' of the open ends 1' and 2' of the conduit portions 1 and 2) on a large radius R as shown in FIG. 2.

FIG. 2 shows also that the endportions $3^{IV}$ are of different lengths and that they are each provided with sockets 4 which in the illustrated embodiment are also synthetic plastic material, for instance polybutene and are welded to the endportions. These sockets receive the ends 1' and 2', respectively, and are provided in their interior with a circular abutment 4' having the same internal diameter as that of the outer diameter of the endportions $3^{IV}$ and ends 1', 2', respectively, so that each endportion and an associated open end can be abutted against the respective abutment 4' from opposite axial sides. Thereupon, the respective endportion is also heat-welded to the socket 4.

It will be seen that the present invention provides a construction which meets the requirements which have been outlined above in the introductory portion of this specification, and avoids the disadvantages that have also been set forth.

It will be understood that each of the elements described above, or two or more together, may also find a useful application in other types of constructions differing from the types described above.

While the invention has been illustrated and described as embodied in a convoluted conduit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. As an article of manufacture, a convoluted conduit comprising at least two substantially parallel conduit portions having respective adjacent open ends; and a substantially horseshoe-shaped tubular fitting connecting said conduit portions and having two parallel endportions each communicating with one of said open ends and a loopshaped intermediate portion connecting said endportions, said fitting having an inner diameter which is at least substantially equal to that of said conduit portions.

2. A conduit as defined in claim 1, wherein at least one of said fitting and said conduit portions is of synthetic plastic material.

3. A conduit as defined in claim 1, wherein said intermediate portion comprises two substantially straight sections each communicating with one of said endportions, and a substantially semi-circularly curved section connecting said straight sections remote from said endportions.

4. A conduit as defined in claim 1, wherein said fitting is of synthetic plastic material.

5. A conduit as defined in claim 4, wherein said conduit portions are of synthetic plastic material; and further comprising sockets of synthetic plastic material provided on said endportions and each accommodating one of said open ends.

6. A conduit as defined in claim 1, wherein said fitting is of polybutene.

7. A conduit as defined in claim 6, wherein said fitting has an outer diameter of 20 mm and a wall thickness of 2 mm; and wherein the radius of curvature of said curved section is at most 90 mm.

8. A conduit as defined in claim 1, wherein said fitting is of metallic material and said conduit portions are of synthetic plastic material; and further comprising connectors connecting said endportions with said open ends.

9. A conduit as defined in claim 1, wherein one of said endportions is longer than and extends axially beyond the other endportion in direction away from said intermediate portion.

* * * * *